United States Patent
Nakamura et al.

(10) Patent No.: US 7,127,522 B1
(45) Date of Patent: Oct. 24, 2006

(54) MESSAGE MULTICAST METHOD AND COMPUTER

(75) Inventors: Yuhichi Nakamura, Yokohama (JP); Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,181

(22) Filed: Jun. 21, 1999

(30) Foreign Application Priority Data

Jun. 24, 1998 (JP) .................................. 10-176801

(51) Int. Cl.
*G06F 15/173* (2006.01)
*G06F 13/42* (2006.01)

(52) U.S. Cl. ...................... 709/238; 709/201; 455/418; 710/105

(58) Field of Classification Search ................ 709/203, 709/206, 220, 222, 228, 230, 224, 226, 232, 709/245, 227, 248, 250, 201, 238; 364/286.4, 364/286.5; 380/4, 25, 23; 370/60, 92, 238, 370/329; 455/412.1, 6.3, 418; 714/4; 710/105
See application file for complete search history.

(56) References Cited

U.S. PATENT DOCUMENTS

| | | | | |
|---|---|---|---|---|
| 5,511,215 A | * | 4/1996 | Terasaka et al. | 712/25 |
| 5,542,046 A | * | 7/1996 | Carlson et al. | 713/200 |
| 5,563,878 A | * | 10/1996 | Blakeley et al. | 370/392 |
| 5,734,651 A | * | 3/1998 | Blakeley et al. | 370/392 |
| 5,953,507 A | * | 9/1999 | Cheung et al. | 709/250 |
| 5,963,861 A | * | 10/1999 | Hanson | 455/456.1 |
| 6,044,367 A | * | 3/2000 | Wolff | 707/2 |
| 6,052,372 A | * | 4/2000 | Gittins et al. | 370/396 |
| 6,055,573 A | * | 4/2000 | Gardenswartz et al. | 709/224 |
| 6,081,508 A | * | 6/2000 | West et al. | 709/228 |
| 6,226,746 B1 | * | 5/2001 | Scheifler | 713/200 |
| 6,430,698 B1 | * | 8/2002 | Khalil et al. | 714/4 |
| 6,493,318 B1 | * | 12/2002 | Bare | 370/238 |
| 6,516,191 B1 | * | 2/2003 | Greenspan et al. | 455/412.1 |

(Continued)

FOREIGN PATENT DOCUMENTS

JP    PCTUS9710878    6/1997

OTHER PUBLICATIONS

"Protocol Management Mechanisom for Agent Interaction" IBM TDB, vol. 40, No. 12, p. 29 (Dec. 1997).

(Continued)

*Primary Examiner*—Khanh Quang Dinh
(74) *Attorney, Agent, or Firm*—Anne Vachon Dougherty

(57) ABSTRACT

To provide a message sending function which reflects "taste" in a destination agent designated by a user and a policy of the market in which agents operate. When multicasting a message to agents, a message monitor executes the steps of: receiving preferential destination information designated by a user along with the message; determining to which agents the message is to be sent, by referring to the preferential destination information; and sending the message to the agents determined as destinations. This preferential destination information designated by a user is the information representing a user's "taste" which is represented, for instance, by an agent name and a priority (or weight). It is also possible that the destination determining step comprises a step of referring to a messaging policy data defining priorities of agents to which the message can be sent. By doing so, it becomes possible to reflect a policy of a market's sponsor on message sending. Moreover, it is also possible to transform it so that a message destination is determined by referring only to a messaging policy data rather than preferential destination information designated by a user.

9 Claims, 11 Drawing Sheets

U.S. PATENT DOCUMENTS 6,519,525 B1 * 2/2003 Namba ................. 701/200
6,577,600 B1 * 6/2003 Bare .................... 370/238
6,587,438 B1 * 7/2003 Brendel ................ 370/238
6,741,575 B1 * 5/2004 Zhang et al. .......... 370/329

OTHER PUBLICATIONS

"Communication Method for a Mobile Agent Using an Existing Protocol" IBM TDB, vol. 40, No. 8, pp. 127-129 (Aug. 1997).

* cited by examiner

```
┌─────────────────────────────────────────────────┐
│ ☐ OUTPUT SCREEN DISPLAY                         │
│                                                 │
│          Search Results                         │
│                ┌──────┬───────────┬───────┬────────┐
│                │Agent │Destination│Airline│ Price  │
│  ┌──────────┐  ├──────┼───────────┼───────┼────────┤
│  │DETAIL BUTTON│ │Agent-1│   HNL    │  JL  │¥100,800│
│  ├──────────┤  ├──────┼───────────┼───────┼────────┤
│  │DETAIL BUTTON│ │Agent-2│   HNL    │  UA  │¥98,000 │
│  └──────────┘  ├──────┼───────────┼───────┼────────┤
│                │  ⋮   │    ⋮      │   ⋮  │   ⋮    │
│                └──────┴───────────┴───────┴────────┘
│                                                 │
└─────────────────────────────────────────────────┘
```

FIG. 5

Message
  <Message名>
    <paremeter name>=<value>
    <paremeter name>=<value>
    <paremeter name>=<value>
    •
    •
    •
Preference
    <shop id, weight>
    <shop id, weight>
    <shop id, weight>
    •
    •
    •

(a)

Message
  RequestTravelGoods
    Requirements=
      (CATEGORY=AirTicket and
      Destination=Honolulu and
      PRICE<500000)
    MaxSize=20
  Preference
    Agent-5, 20
    Agent-4, 10

(a)
```
DB Scheme
    Column1:<type>
    Column2:<type>
    Column3:<type>
    Column4:<type>
        .
        .
        .
    Column-i:<type>
    Common:boolean
```

(b)
```
Scheme for AirTicket
    Departure:String
    Destination1:String
    Destination2:String
    Destination3:String
    Airline:String
    Price:Integer
    TicketType:String
    Class:String
    Common:boolean
```

FIG. 10

(a)
```
MessageType : Candidate message type
MaxNumber : The maxmum number of agents to which a message is delivered
Mandatory : Agents to which a message must be delivered
Priority : Weighting for delivering a message to remaining agents
           (represented by a set of an agent id and weight)
```

(b)
```
MessageType:RequestAirTicket
MaxNumber:3
Mandatory:agent-3, agent-4
Priority:
    <Agent-1, 10>
    <Agent-2, 30>
    <Agent-5, 50>
```

FIG. 11

```
Message Types
   RequestTravelGoods [A, B]
      Requirement as QueryType
      Maxsize as integer
   ProvideExactGoods [B, A]
      Goods as Collection<Thing>
   RecommendGoods [B, A]
      Goods as Collection<Thing>

Category
   AirTicket
      Super:TravelGoods
      Departure:String
      Destinations:Collection<String>
      Airline:String
      Price:Integer
      TicketType:Enum<String> {Fix, Open, FixOpen}
      Class:Enum<String> {Y, C, F, P}
```

FIG. 12

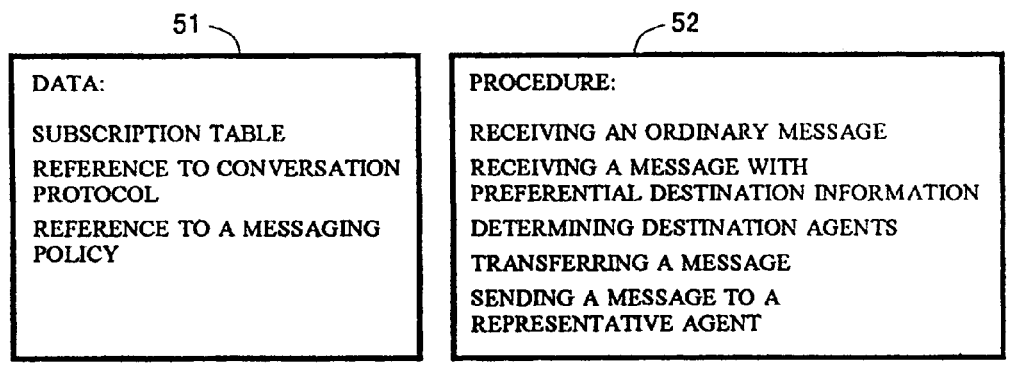

FIG. 13

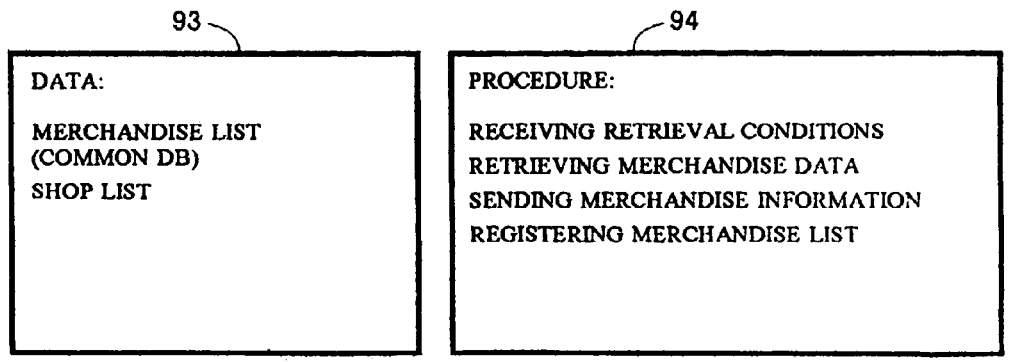

FIG. 17

```
            DB Scheme
              Column1:<type>
              Column2:<type>
              Column3:<type>
              Column4:<type>
                   .
(a)                .
                   .
              Columni:<type>
              Agent-id:String Scheme for AirTicket
             Departure:String
             Destination1:String
             Destination2:String
             Destination3:String
             Airline:String
             Price:Integer
(b)          TicketType:String
             Class:String
             Agent-id:String
```

MESSAGE MULTICAST METHOD AND COMPUTER

FIELD OF THE INVENTION

This invention relates to an agent technology for online interactions; and, more particularly, relates to the sending of a controlling message in an agent server.

BACKGROUND OF THE INVENTION

As regards online shopping on WWW (World Wide Web), several successful examples have been reported in the fields including travel, books, CDs (Compact Disks) and employment information, which is expected to increasingly develop in future. This form of online shopping is shifting from merely exhibiting merchandise as in the conventional HTML (Hyper Text Markup Language) files or DB (DataBase) and CGI (Common Gateway Interface) to retrieving multiple sites as a single unit and to learning users' taste to find appropriate goods, etc. An agent technology is well suited to address these new online shopping approaches. For instance, an information retrieval agent for each user and an information providing agent for each company which opens a shop can be generated to interact to enable information retrieval and sale of merchandise. While these agents may be moving agents, they act together on one site (agent server) at least temporarily.

To exchange messages between agents in such a way so that they can interact, there must be common rules for interaction between them. Accordingly, if a type database defining the rules for interaction between agents is established on an agent server (see IBM TDB Vol. 40 No. 12, pp. 29 December, 1997, for instance) and an agent which outputs a message in compliance with the rules is generated, interaction is possible on the agent server with other agents which are also in compliance with the rules.

Attempts are being made to standardize interaction between agents, such as KQML (Knowledge Query Manipulation Language) and ACL (Agent Communication Language). While a set of messages which can be used by agents is predefined in either of them, differences are found in the types of provided methods and the ways of formulation. In KQML, in addition to primitive messages such as "questions" and "answers," a series of messages called "facilitator messages" are provided to have a mediator search an agent for the other party. In ACL, only primitive messages are provided, but the way to formulate constraints among messages is more strict and formulation by using an operator to represent a psychological state of an agent is attempted.

To describe a little about this facilitator message in KQML, an agent which wants to have a message delivered preregisters itself to a special agent, called a "facilitator" which mediates a message from another agent. Since this facilitator sends a message to all the registered agents, it does not have a feature to change its destination according to the state at the time.

As above, the above-mentioned facilitator does not provide a message sending feature reflecting a user's taste each time. While there is also a method to send a message by explicitly specifying multiple agents, it has drawbacks including being troublesome for a user and overloading the system when many messages are specified. Accordingly, it is better to limit the number of messages to be sent according to the computer's ability. In addition, there must be a way to reflect a policy of the market in which agents operate. For instance, if an owner of a shop agent has paid more than usual for opening the shop, additional privileges may be provided, such as the service of surely sending messages to the shop. The conventional technologies do not provide these features.

Thus, an object of the present invention is to provide a message sending feature which reflects "taste" in a destination agent designated by a user.

In addition, another object is to provide a message sending feature which reflects a policy of the market in which the agents operate.

In addition, a further object is to enable the system's load to be controlled by controlling the number of messages to be sent.

Still further objects are to provide an agent technology of high usability and to provide a technology which allows diversification of services by market sponsors.

SUMMARY OF THE INVENTION

In order to attain the above objects in the present invention, when multicasting a message to an agent, a message monitor executes the steps of: receiving preferential destination information designated by a user along with a message; determining to which agents the message is to be sent, by referring to the preferential destination information designated by the user; and sending the message to the agents determined as destinations. This preferential destination information designated by a user is information representing the user's "taste" which is, for instance, represented by an agent name and priority (or weight).

It is also possible that the determining step comprises a step of: referring to messaging policy data defining priorities of agents to which the message can be sent. By doing so, it becomes possible to reflect a policy of a market sponsor on message sending. It is also possible to transform it so that a message destination is determined by referring not to preferential destination information designated by a user but to messaging policy data.

Moreover, in one embodiment, destinations are determined in the determining step, from an agent having the highest priority, by using the priorities of agents defined in the messaging policy data and pairs of agent names and priorities included in the preferential destination information designated by a user.

Since a required type of message may be different depending on the shop agent, the messaging policy data may be defined for each type of message, and may also define the number of destination agents for each type of messages. Also, the number of destination agents may be determined by considering the system's load.

The inventive method may further comprise a step of: sending a message along with information concerning agents not determined as destinations to a representative agent which represents agents to which a message can be sent. This enables information from agents of low priority, to which messages were not sent, to be obtained from the representative agent, so that information from agents existing across the system can be obtained while reducing the system's load.

Meanwhile, a representative agent generates a response message for a source of a message, by referring to information from preregistered agents to which a message can be sent.

As above, the present invention is represented as a flow of processing, but it is also possible to implement a computer, a computer program, a circuit or a device, which performs the above processing. Moreover, when implementing it by a computer program, the computer program may be stored on a storage medium such as a CD-ROM or a floppy disk.

BRIEF DESCRIPTION OF THE DRAWINGS

The invention will now be described in greater detail with specific reference to the appended drawings wherein:

FIG. 5 is a diagram showing an example of a screen for outputting retrieval results of customer agent 9;

FIG. 6 is a diagram showing an example of a message with preferential destination information;

FIG. 10 is an example of a DB schema of shop agent 7's merchandise DB;

FIG. 11 is a diagram showing an example of messaging policy 15;

FIG. 12 is a diagram showing an example of a conversation rule 13;

FIG. 13 is a diagram for explaining message monitor 5;

FIG. 17 is a diagram for explaining representative agent 11;

DESCRIPTION OF THE PREFERRED EMBODIMENT

Figure 1:
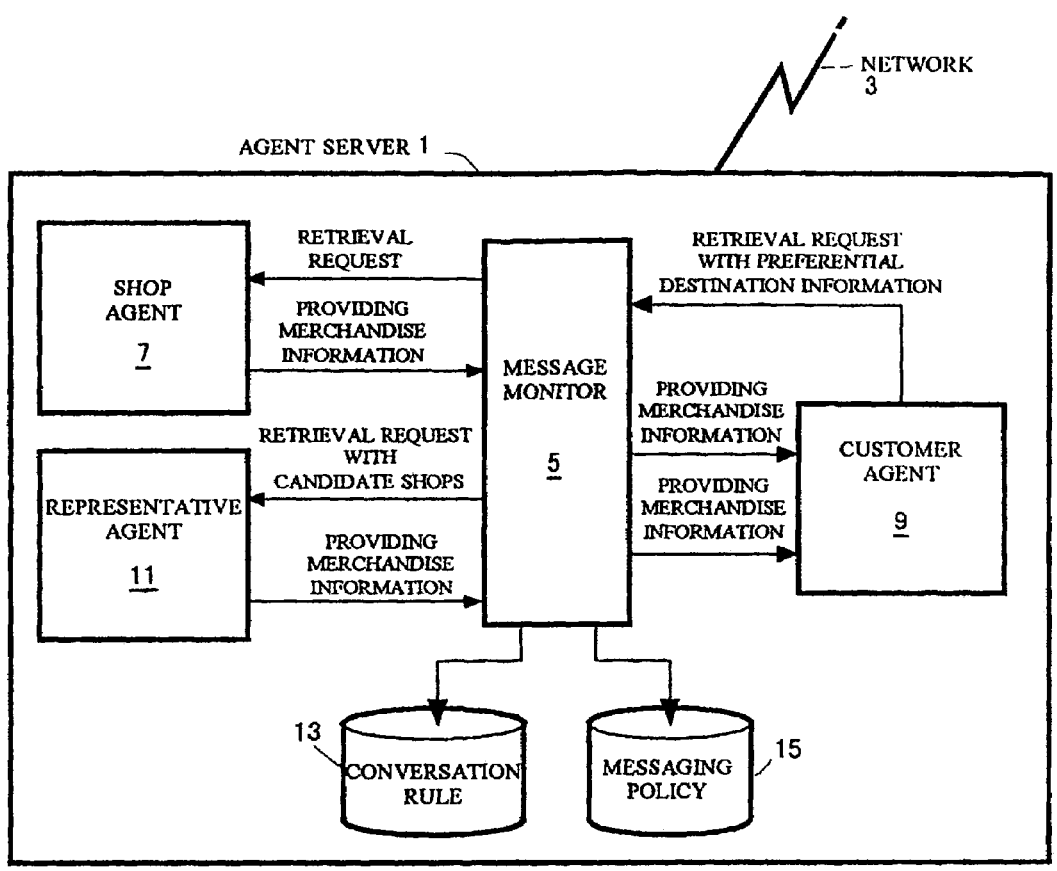
FIG. 1 is a functional block diagram of the present invention.

FIG. 1 shows a diagram representing functional blocks required for the present invention. Agent server 1 is connected to network 3. Other computers not shown in the diagram are connected to network 3, including a computer of an owner of customer agent 9 who comes to the marketplace in the present invention. Moreover, a computer of the owner of shop agent 7 on the marketplace may also be connected to network 3. Agent server 1 has an execution environment for agents, not shown in the diagram provided, where shop agent 7, customer agent 9 and representative agent 11 are active. Message monitor 5 controls message sending between agents is a central portion of the present invention. This message monitor 5 refers to rules for interaction 13 and messaging policy 15. Rules for interaction 13 describe a form of a message which can be used on agent server 1, and the agents generated according to the rules may interact with other agents by messages in this market. Moreover, though it is not directly related to the present invention, it may also be examined whether or not a message from an agent is in compliance with the rules for interaction 13. Also, while FIG. 1 shows one each of a customer agent 9 and a shop agent 7, it is for the purpose of easier explanation and there usually exist multiple of them. It is also possible to have multiple representative agents 11.

Figure 2:
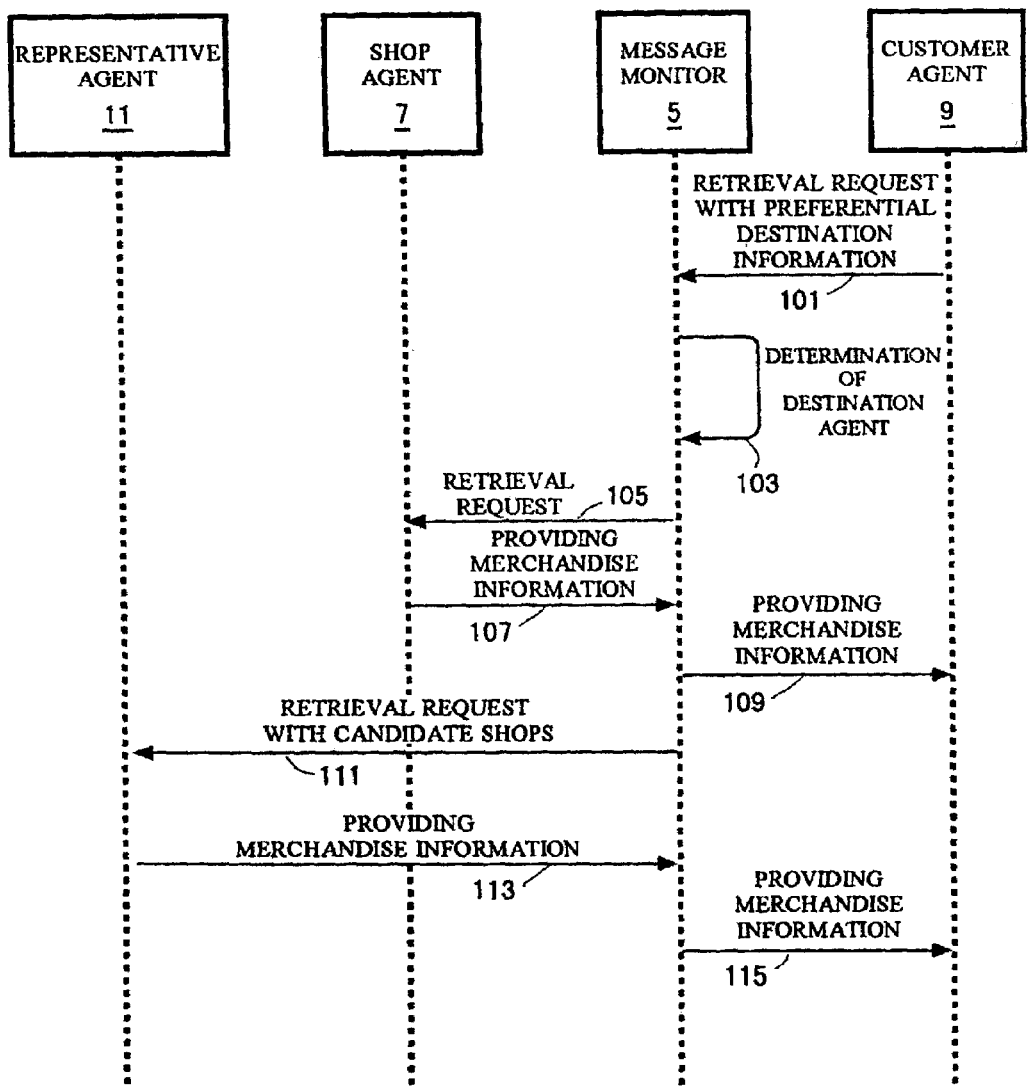
FIG. 2 is a diagram for explaining the operation of the functional block diagram shown in FIG. 1.

FIG. 2 shows how the components in agent server 1 of FIG. 1 operate. First, customer agent 9 sends a retrieval request message with preferential destination information to message monitor 5 (step 101). Preferential destination information is information corresponding to a user's "taste" and represents to which agents a message should preferably be sent. A retrieval request in this embodiment is a retrieval request for travel information, for instance, information of package tours and that of airline tickets. When receiving a retrieval request message with preferential destination information, message monitor 5 determines a destination agent (step 103). At this time, it refers to preferential destination information received from customer agent 9 and messaging policy data 15. This process is explained in detail later. The retrieval request message is sent to shop agent 7 which was determined as a destination (step 105). Then, the shop agent 7 performs a retrieval process and sends a merchandise information offering message to the message monitor 5 (step 107). This merchandise information offering message is sent as it is to customer agent 9 (step 109).

If message destinations are determined by referring only to messaging policy data 15 representing a market operation policy and preferential destination information designated by a user, there will be shop agents to which no message is sent. Even such shop agents, however, may in fact have useful information for a user. Therefore, representative agent 11 responds representing the shop agents to which no message is sent. Thus, at least a part of shop agent 7's merchandise information is registered in representative agent 11. A retrieval request message with a list of shop agents which were not designated as destination agents in message monitor 5 (a list of candidate shops for representative agent 11) is sent from message monitor 5 to representative agent 11 (step 113). At representative agent 11, a retrieval process is performed for information it is holding, a merchandise information offering message is generated, and the merchandise information offering message sent to message monitor 5 (step 113). Message monitor 5 transfers the merchandise information offering message from representative agent 11 to customer agent 9 (step 115).

Figures 3, 4:
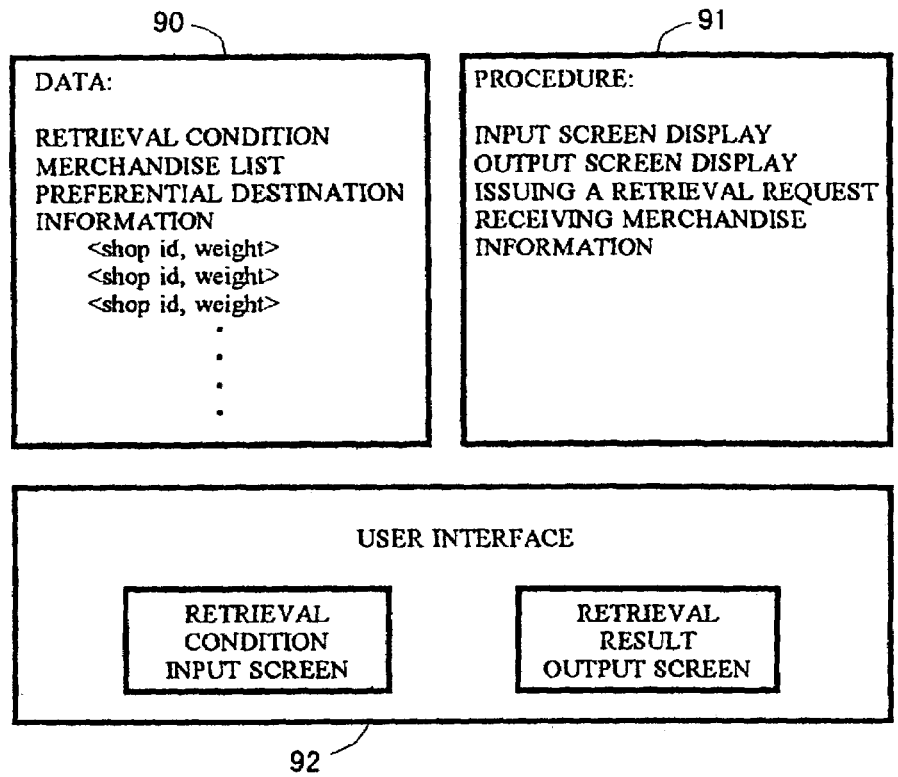
FIG. 3 is a diagram for explaining customer agent 9.
FIG. 4 is a diagram showing an example of a screen for entering retrieval conditions in customer agent 9.

Next, configuration and processing of each component is explained in detail. In this embodiment, customer agent 9 is a mobile agent which has been generated based on a object-oriented technology. So, the agent can be roughly divided into the two parts comprising the object's data 90 and procedure 91 (program) (FIG. 3). User interface 92 is a part of the data. Data 90 comprises retrieval information, a merchandise list (in case retrieval results are held) and preferential destination information. Preferential destination information includes shop IDs and weights (priorities) corresponding to the shop IDs. This preferential destination information may include either one agent or more. The procedure includes the input screen display procedure, output screen display procedure, retrieval request message issue procedure, merchandise information receiving procedure, etc. Besides, a procedure for selecting goods and preferential destination information updating procedure may be included.

The input screen display procedure outputs a screen for entering retrieval conditions in a user interface as shown in FIG. 4, for instance. This screen is the one shown on a user's computer. As this embodiment shows retrieval of travel information as an example, CATEGORY is information of whether it is about package tours or airline tickets. Destination is a place name, such as Honolulu or Bangkok. MAX PRICE shows an upper limit of the sum for an airline ticket, etc. Preference is preferential destination information which is entered as a pair of shop agent's ID and the shop agent's priority. If the Search button is pressed, customer agent 9 is sent to agent server 1.

On the other hand, the output screen display procedure outputs the retrieval result output screen in a user interface as shown in FIG. 5. The merchandise information offering messages received in the merchandise information receiving procedure are displayed together on a user's computer. In FIG. 5, shop agent Agent-1 responded 100,800 yen for HNL (abbreviation for Honolulu) by the JL airlines and shop agent Agent-2 responded 98,000 yen for HNL by the UA airlines. Further detailed information is displayed by pressing a detail button set on each line.

In the retrieval request message issue procedure, a retrieval request message with preferential destination information, as shown in FIG. 6, is generated and sent to message monitor 5. FIG. 6 (*a*) shows a format of a general retrieval request message with preferential destination information. The Message part includes a message name (type), a parameter in the message and its value. On the other hand, the Preference part retains a shop ID and weight information as one pair. For instance, a retrieval request message with preferential destination information as in FIG. 6 (*b*) is generated. As regards FIG. 6 (*b*), the message is named RequestTravelGoods and is a request for retrieving travel goods while Requirements show retrieval conditions. In this case, up to twenty retrieval results are collected. On the other hand, the Preference part shows that Agent-1's weight is 20 and Agent-2's weight is 10. As regards the retrieval information receiving procedure, it is not explained any more since it receives and stores a message sent from message monitor 7. If a retrieval result is more than a designated maximum number, the portion exceeding the designated number may be discarded.

Figure 7:
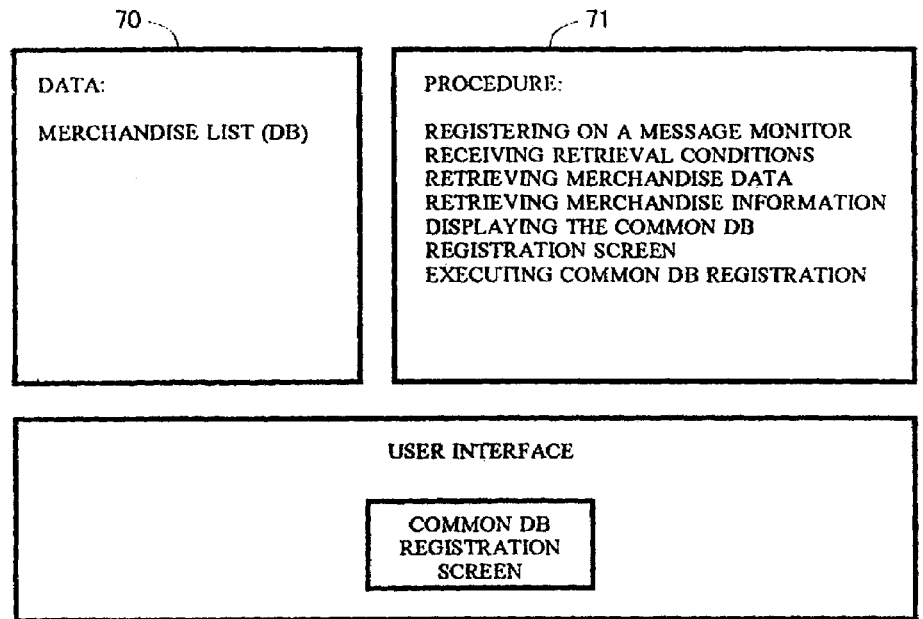
FIG. 7 is a diagram for explaining shop agent 7.

FIG. 7 shows details of shop agent 7. In this embodiment, customer agent 7 is also a mobile agent like customer agent 9 which has been generated based on a object-oriented technology. Therefore, it can be roughly divided into data 70 and procedure (program) 71. User interface 72 is a part of the data portion 70. The data 70 comprises a database which is a merchandise list. Also, procedure 71 includes a procedure for registering to a message monitor, a retrieval condition receiving procedure, a merchandise data retrieval procedure, merchandise information sending procedure, a common DB registration screen display procedure, a common DB registration procedure, etc. User interface 72 includes a common DB registration screen which is used by the common DB registration screen display procedure. Meanwhile, a common DB is data retained by representative agent 11.

Figure 8:
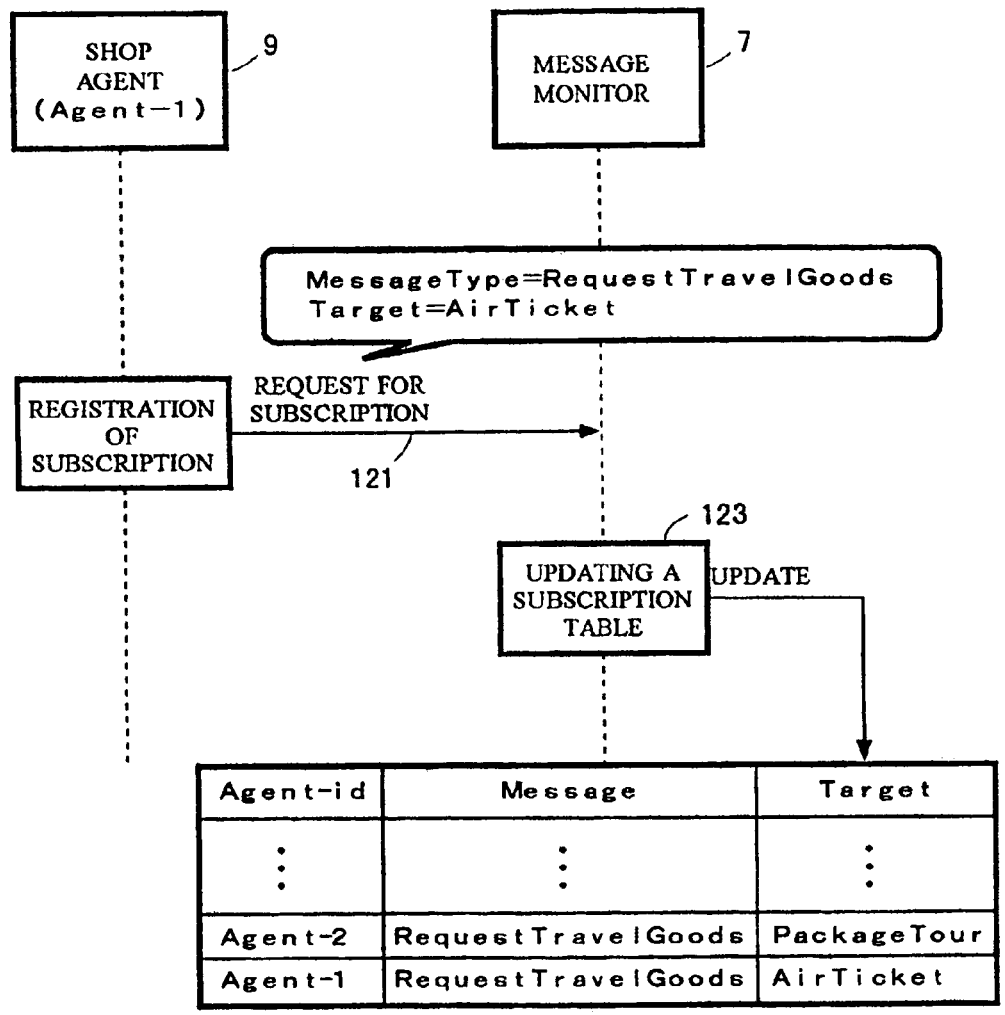
FIG. 8 is a diagram for explaining a process of registering shop agent 7 on message monitor 5 for subscription.

A procedure for registering to a message monitor is a procedure for registering what type of message is to be transferred to the shop agent 7 when it arrives at agent server 1. FIG. 8 shows the details. Shop agent 9 whose agent ID is Agent-1 outputs a request for subscription at this registration (step 121). This request for subscription contains a message name (MessageType) to be transferred. Furthermore, it is also possible to designate a target in the message. In the example of FIG. 8, the MessageType is RequestTravelGoods (travel information request message) and the target in it is AirTicket (airline ticket). Message monitor 7 registers the received request contents in its own table (step 123). More generally, shop agent 9 updates the table content since it can change registered contents in the middle of the processing.

The retrieval condition receiving procedure, merchandise data retrieval procedure, and merchandise information sending procedure are not explained any more since they are not different from conventional ones.

Figure 9:
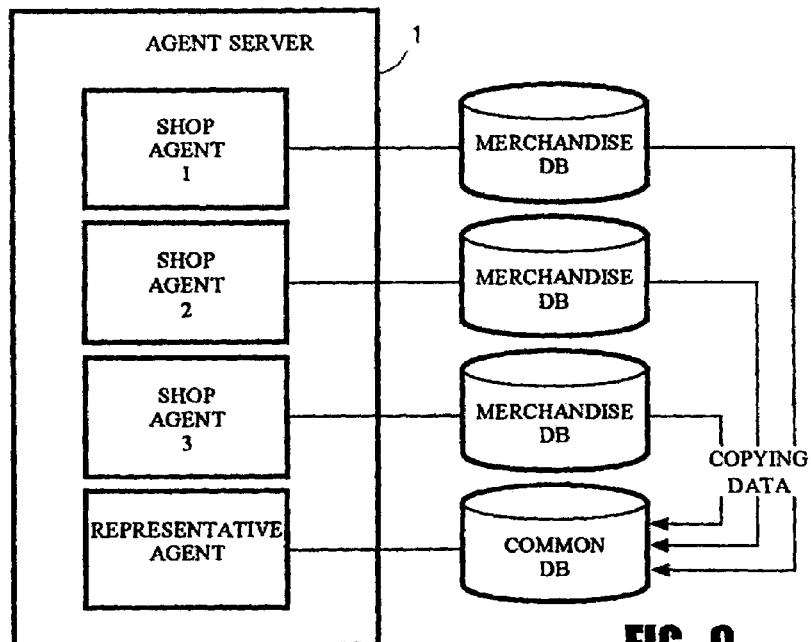
FIG. 9 is a diagram schematically showing copying of shop agent 7's merchandise DB to a common DB of the representative agent 11.

The common DB registration screen display procedure is to display a common DB registration screen, which shows the shop agent 9's owner that at least a part of its merchandise list is registered. The common DB registration procedure, as schematically shown in FIG. 9, is to copy information of merchandise information databases owned by each shop agent 9 to a common database of representative agent 11 for when the shop agent 9 is not selected as a destination. Thus, the common DB registration procedure performs a process for requesting representative agent 11 to copy at least a part of a merchandise list.

FIG. 10 shows an example of a DB schema of shop agent 9's merchandise list. FIG. 10 (*a*) is a general representation describing the type for each column. A column of Common is defined in it, and its value is either true or false. This column of Common represents that data of a line which is true is copied to a common database. Whether this column of Common is set as true or false is predetermined when generating shop agent 9. FIG. 10 (*b*) is an example of an AirTicket where the Departure, Destinations 1 to 3, Airlines, Price, TicketType, Class and Common are defined.

Next, messaging policy 15 is explained by using FIG. 11. Messaging policy 15 shows an operation policy of a market in agent server 1. An operation policy includes a policy, namely, a message from a customer agent must be transferred to a certain shop agent, or a certain shop agent is always fixedly weighted and a message is transferred according to the weighting, etc. A priority of a shop agent shown by this weighting may be based either on an opening fee paid to a market sponsor or on contents of services provided by the shop agent. It is also possible to define the number of messages to be sent in response to one message from one customer agent by considering the processing load of the entire system of agent server 1. FIG. 11 (*a*) shows an example of general representation of messaging policy 15. MessageType defines a covered message type, MaxNumber defines the maximum number of agents to which a message is delivered, Mandatory defines an agent to which a message must be delivered, and Priority defines weighting in delivering a message for remaining agents. Priority is represented by a set of an agent ID and weight. FIG. 11 (*b*) is an example in this embodiment which covers RequestAirTicket in which a message is sent to 3 shop agents maximum, and the agents to which a message must be sent are agent-3 and agent-4. Weightings are 10, 30 and 50 for Agent-1, Agent-2 and Agent-5 respectively.

FIG. 12 shows an example of a conversation rule 13. The conversation rule 13 determines a so-called language in an agent server 1's marketplace. Namely, since the conversation (interaction) cannot be made unless the message's format fits between agents, the message's format is defined. The format also includes an order of issuing messages. It is also possible to have message monitor 5 determine whether or not an incorrect message is issued or whether or not issued in an incorrect order by referring to this conversation rule 13. If it detects an incorrect message, it may discard it. In FIG. 12, MessageTypes show a message of which format should be issued from which message in which order. [A, B] indicates that it is issued from A to B. Here, a data format of AirTicket is shown in Category. Enum<string>{ } means selecting from a string in { }. The conversation rule 13 is not explained any more since the rules are not directly related to the present invention.

Next, message monitor 5 is explained by using FIG. 13. Message monitor 5 comprises data 51 and procedure (program) 52 just like an agent. The data portion 51 comprises a table for subscription explained by using FIG. 8, reference to conversation protocol 13, and reference to messaging policy 15. Procedure 52 includes the receiving procedure for an ordinary message other than the present invention, destination agent determining procedure, message transfer procedure, procedure for sending a message to representative agent, etc. The receiving procedure for an ordinary message is the same as usual, so it is not explained here.

A procedure for receiving a message with preferential destination information performs a process for receiving a message with preferential destination information as already explained by referring to FIG. 6. If this message with preferential destination information is received, the message is passed to a destination agent determining procedure.

A message transfer procedure sends an ordinary message as it is to a destination agent and a response message from a shop agent to a destination customer agent. It also sends a response message from a representative agent to a destination customer agent.

Figure 14:
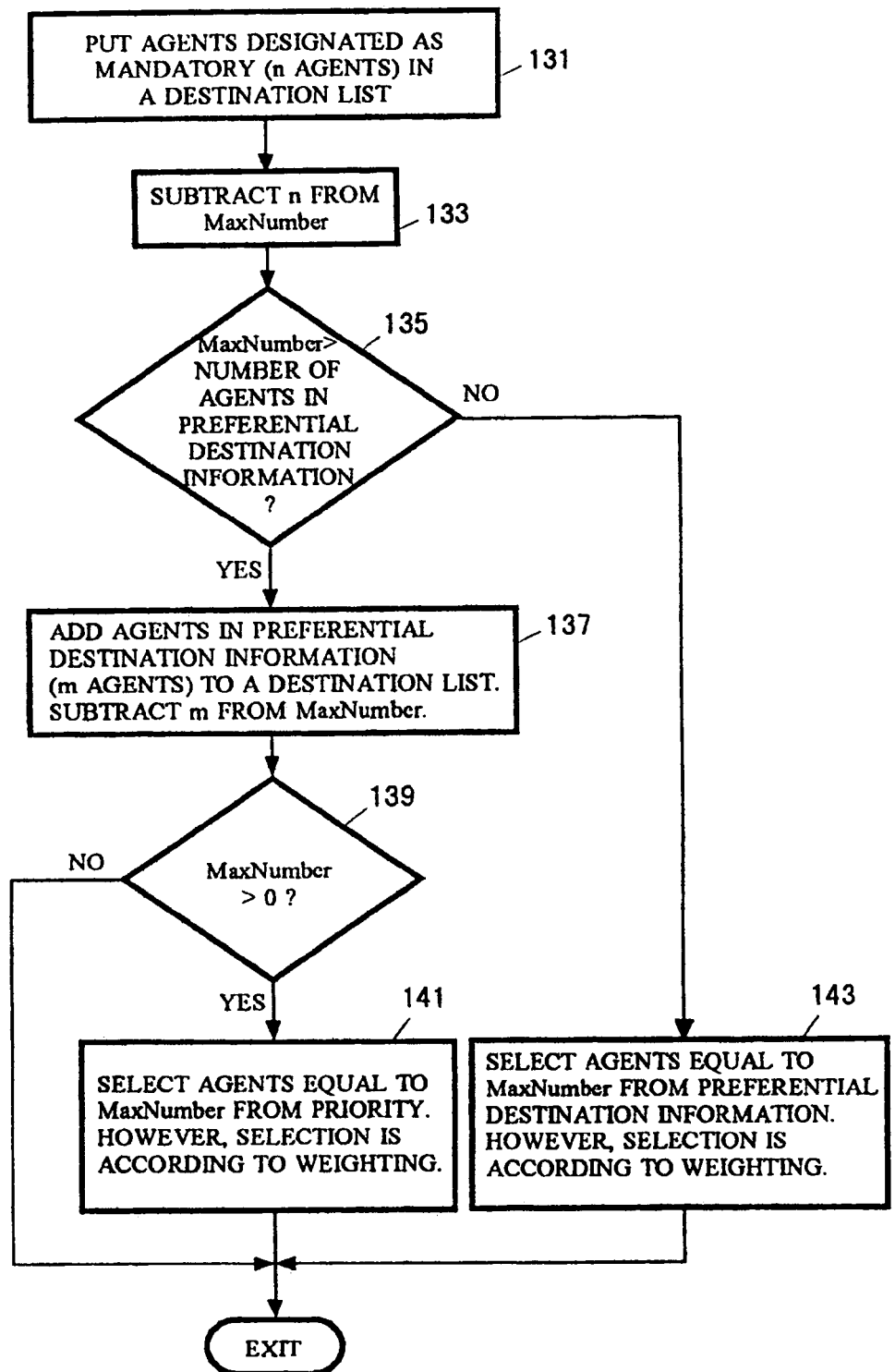
FIG. 14 is a flowchart showing a processing of generating a message destination list.

A destination agent determining procedure is explained by referring to FIG. 14. In this embodiment, an item about a message name is located by referring to messaging policy 15 and preferential destination information attached to a message. Therein, an agent designated as Mandatory, which means that it must be sent, is put in a destination list (step 131). While this Mandatory designation was defined in messaging policy 15 in the above example, it may also be defined in the preferential destination information. The number of agents n designated as Mandatory is subtracted from MaxNumber, the maximum number of destinations defined in messaging policy 15, and the value is put in MaxNumber (step 133). Then, this MaxNumber is compared with the number of agents in the preferential destination information (step 135). If the number of agents in the preferential destination information is larger than MaxNumber, a message cannot be sent to every agent designated in the preferential destination information. So, agents equal to MaxNumber are selected from the preferential destination information and added to the destination list (step 143). At this time, the selection is made according to the weighting (priorities) of agents defined in the preferential destination information. It is also possible to refer to the messaging policy 15. Namely, MaxNumber of them are selected sequentially from the one with the largest value of weighting. It is also possible to design it so that selection is made at random but probability then is calculated from values of weighting. Thus, a message may be sent even if its priority is low, and a message with the same preferential destination information may have a different destination from the previous one. For instance, if agent-1 is defined as weight 10, agent-2 as weight 30 and agent-5 as weight 50, agent-1's probability is 1/9, agent-2's probability is 1/3, and agent-5's probability is 5/9.

On the other hand, if MaxNumber is larger than the number of agents in preferential destination information, the agents in the preferential destination information (m agents) are added to the destination list (step 137). Then, m is subtracted from MaxNumber, and the value is put in Max-Number. If the value of MaxNumber after the subtraction is 0, the processing is terminated (step 139). On the other hand, if MaxNumber is larger than 0, MaxNumber agents included in the Priority field in the messaging policy are selected in order of weight (priority) and added to the destination list (step 141). This step 141 selects at random like step 143, but the probability then can be transformed to be calculated from the values of weighting. Thus, agents are put in the destination list according to preferential destination information and messaging policy 15, and a message is sent to the agents in the destination list.

This flow does not assume a case where an agent designated as Mandatory is also designated in preferential destination information. In such a case, however, a step of verifying duplication can be included after step 133, and if there is duplication, the number of agents in preferential destination information in step 135 can be reduced by the number of the duplicated agents.

Figure 15:
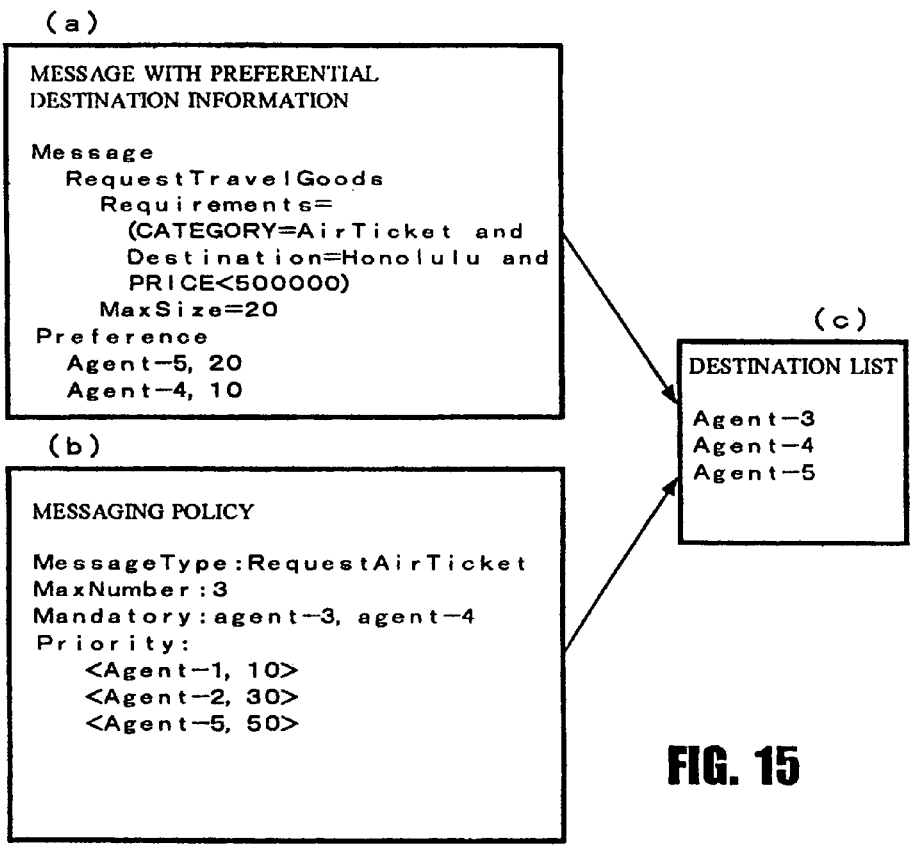
FIG. 15 is a diagram showing an example for explaining generation of a message destination list.

FIG. 15 shows a concrete example. In the example (a) of a message with preferential destination information, Agent-5 is defined as having weight 20 and Agent-4 as having weight 10. On the other hand, since the message name of the message with preferential destination information is RequestTravelGoods and its Category is AirTicket, MessageType of messaging policy 15 refers to the RequestAirTicket field (FIG. 15(b)). In this (b), the maximum number of agents to be sent (MaxNumber) is 3 and agent-3 and agent-4 are designated as the agents which must be sent. Also in Priority field, agent-1 is defined as weight 10, agent-2 as weight 30 and agent-5 as weight 50.

First, since the agents to which a message must be sent are agent-3 and agent-4, they are added to the destination list. Then, it is MaxNumber=3−2=1 which is smaller than the number of agents in the preferential destination information, therefore, an agent with larger weighting value of agent-5 and agent-4 is added to the destination list. However, agent-4, which is included in the preferential destination information, already exists in the destination list. Therefore, agent-5 is automatically added to the destination list, and a destination list such as (c) is completed.

Figure 16:
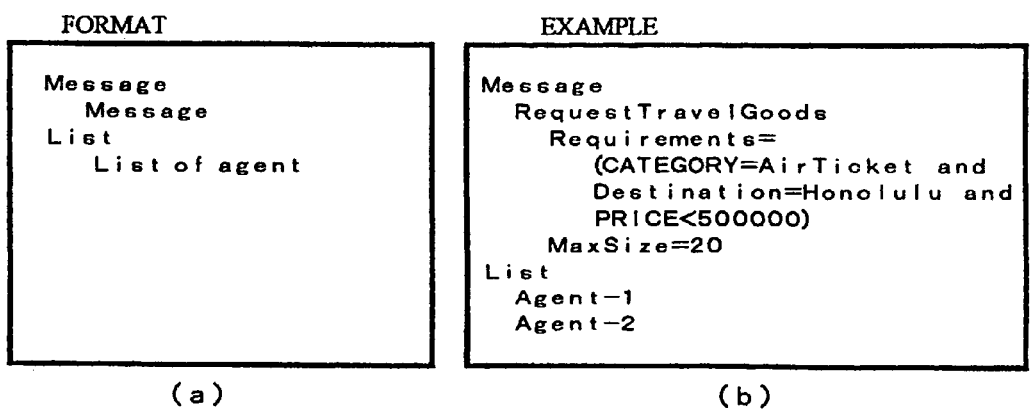
FIG. 16 is a diagram for explaining a message for representative agent 11.

In a procedure for sending a message to a representative agent, a message shown in FIG. 16 is sent after generating the aforementioned destination list. FIG. 16 (a) shows a general format. The Message portion is the same as a message output by a customer agent. Also, the List portion is a list of agents not added to the destination list. For instance, as shown in FIG. 16 (b), agent-3, agent-4 and agent-5 in the five agents were added to the destination list in the example of FIG. 15. Therefore, agent-1 and agent-2 are added to the List portion of the information sent to a representative agent.

Next, FIG. 17 shows the configuration of a representative agent 11. The representative agent 11 also comprises data 93 and procedure (program) 94. The data includes a merchandise list (common DB), and a shop list if it is sent from message monitor 5. The procedures include the retrieval condition receiving procedure, merchandise data retrieval procedure, merchandise information sending procedure and merchandise list registration procedure, etc.

Figures 18, 19:
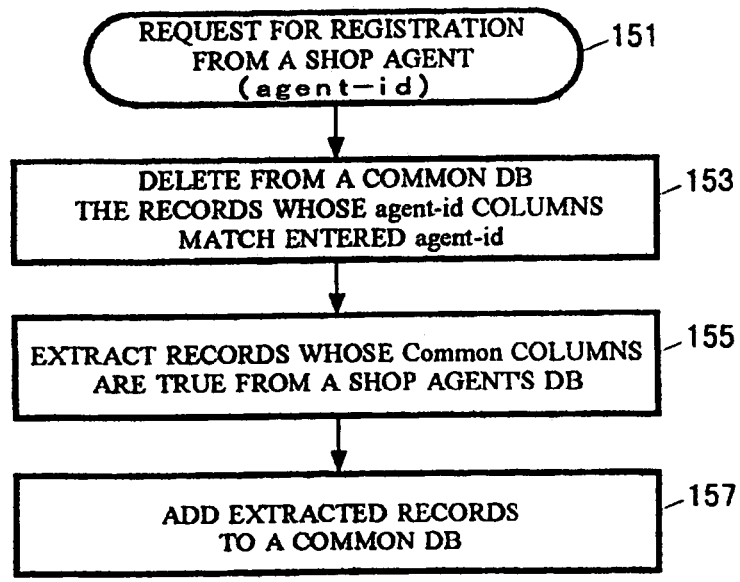
FIG. 18 is a diagram showing an example of a DB schema of representative agent 11's merchandise list (common DB)
FIG. 19 is a flowchart for explaining processing of a request for registration of a merchandise list from shop agent 7.

FIG. 18 shows an example of a DB schema of a merchandise list (common DB). FIG. 18 (a) shows a general format which designates a type for each column. In this common DB, agent-id columns are defined so that each column shows which agent its merchandise information is from. FIG. 18 (b) is an example of AirTicket. The representative agent 11 receives from a shop agent a registration request of at least a portion of merchandise information held by the shop agent. In response to the registration request, a merchandise list registration procedure is performed (FIG.

19). If a registration request from a shop agent (with agent-id) is received (step 151), the record whose agent column matches the entered agent-id is deleted from the common DB (step 153). Then, from the shop agent's DB, the records whose Common columns are true are extracted (step 155). The extracted records are added to a merchandise list (common DB) (step 157). In the case of a first registration, deletion of step 153 may be omitted since it is meaningless.

Since, as regards representative agent 11, the retrieval condition receiving procedure, merchandise data retrieval procedure, and procedure for sending merchandise information resulting from retrieval are not different from conventional technologies, explanation of those is omitted. In a merchandise data retrieval procedure, however, retrieval conditions also include those included in a message, and an agent-id is included in a List of agents from message monitor 5.

As above, in this embodiment, message destination agents can be narrowed down by referring to preferential destination information designated by a user and to the messaging policy 15 reflecting a market operation policy. In addition, even if not designated as a destination, leakage of information retrieval can be kept to a minimum since a representative agent substitutes for at least a part of them.

However, the aforementioned embodiment is merely an example, and various transformations are possible. For instance, a configuration wherein shop agent 7 and customer agent 9 go back and forth between a computer connected to network 3 and agent server 1 was explained. However, it is also possible, for instance, that a customer agent is generated in the agent server 1, and that an HTTP gateway, for instance, is provided between a customer agent and a customer computer for communication with a Web browser run on a customer computer. For more information of this, see IBM TDB Vol. 40, No. 08, pp. 127–129, August, 1997. It is also possible, as explained a little in the description of conversation rule 13, to additionally provide a mechanism to verify whether an active agent sends a message according to the conversation rule 13. Moreover, as agent server 1 does not have to be one, it is also possible to provide multiple on the network so that agents move among the agent servers. There can be multiple markets on an agent server 1.

Also, if there exist multiple marketplaces, an advertising agent advertising marketplaces may advertise so that customer agents come to its own marketplace. In such a case, message monitor 5 also coordinates between a customer agent and an advertising agent by referring to MessageType. In addition, the process of generating a destination list in FIG. 14 is just an example, and it is also possible, after selecting Mandatory agents, to order the agents by considering weighting of the agents in preferential destination information and weighting of the agents in Priority in the messaging policy 15, thereby selecting agents up to MaxNumber.

In accordance with the foregoing, the message sending function which reflects "taste" in a destination agent designated by a user could successfully be provided. In addition, the message sending function which reflects a policy of the market in which agents operate could successfully be provided. Moreover, the system's load can be controlled by controlling the number of messages to be sent. Furthermore, an agent technology of high usability and a technology which allows a diversification of services by market sponsors could successfully be provided.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for multicasting a retrieval request message to more than one of a plurality of mobile request handling agents, comprising the steps of:
    receiving a packet comprising a retrieval request message and non-address preferential destination information for said retrieval request as designated by a user;
    dynamically creating a list of destinations that can respond to said retrieval request, said list comprising more than one of said plurality of mobile request handling agents to whom said message is to be sent, by referring to said retrieval request and said non-address preferential destination information; and
    sending said message to said list of more than one of said plurality of mobile request handling agents determined as destinations for responding to said retrieval request,
    wherein said determining step comprises referring to messaging policy data defining priorities of agents to which said message can be sent, and further comprises a step of: using said priorities of agents defined in said messaging policy data and pairs of agent names and priorities included in said non-address preferential destination information to determine destination agents from an agent having highest priority.

2. The method according to claim 1, wherein said messaging policy data is defined for each type of message.

3. The method according to claim 1, wherein said messaging policy data defines the number of agents which receive the message for each type of message.

4. The method according to claim 1, further comprising a step of: sending information concerning agents which are not determined as destination agents and said message to a representative agent which represents agents to which said message can be sent.

5. The method according to claim 4, wherein said representative agent generates a response message for a source agent of a message, by referring to information from pre-registered agents to which said message can be sent.

6. A computer comprising:
    an execution environment for a plurality of mobile request handling agents;
    a message monitor for receiving a packet, comprising a retrieval request message and non-address preferential destination information designated by a user, from an agent being active in the execution environment for said mobile agents, and for dynamically creating a list of destinations that can respond to said retrieval request, said list comprising more than one of said plurality of mobile agents to whom said message is to be sent by referring to said retrieval request and said non-address preferential destination information, and for multicasting said messages to said list of more than one of said plurality of mobile request handling agents determined as destination agents for responding to said retrieval request; and
    a storage device storing a messaging policy data defining priorities of agents to which said message can be sent;
    wherein said message monitor determines, by using said priorities of agents defined in said messaging policy data and pairs of agent names and priorities included in said non-address preferential destination information, destination agents from an agent having highest priority.

7. The computer according to claim 6, wherein said message monitor sends information concerning agents which are not determined as destination agents and said message to a representative agent which represents agents to which said message can be sent.

8. A storage medium for storing a program executable by a machine for causing the machine to perform method steps for multicasting a retrieval request message to more than one of a plurality of mobile request handling agents, said method comprising the steps of:

receiving a packet comprising a retrieval request message and non-address preferential destination information for said retrieval request as designated by a user;

dynamically creating a list of destinations that can respond to said retrieval request, said list comprising more than one of said plurality of mobile request handling agents to whom said message is to be sent, by referring to said retrieval request and said non-address preferential destination information; and sending said message to said list of more than one of said plurality of mobile request handling agents determined as destinations for responding to said retrieval request, wherein said determining step comprises referring to messaging policy data defining priorities of agents to which said message can be sent, and further comprises a step of: using said priorities of agents defined in said messaging policy data and pairs of agent names and priorities included in said non-address preferential destination information to determine destination agents from an agent having highest priority.

9. The storage medium according to claim 8, wherein said program further comprises a step of: sending information concerning agents which are not determined as destinations and said message to a representative agent which represents agents to which said message can be sent.

\* \* \* \* \*